UNITED STATES PATENT OFFICE.

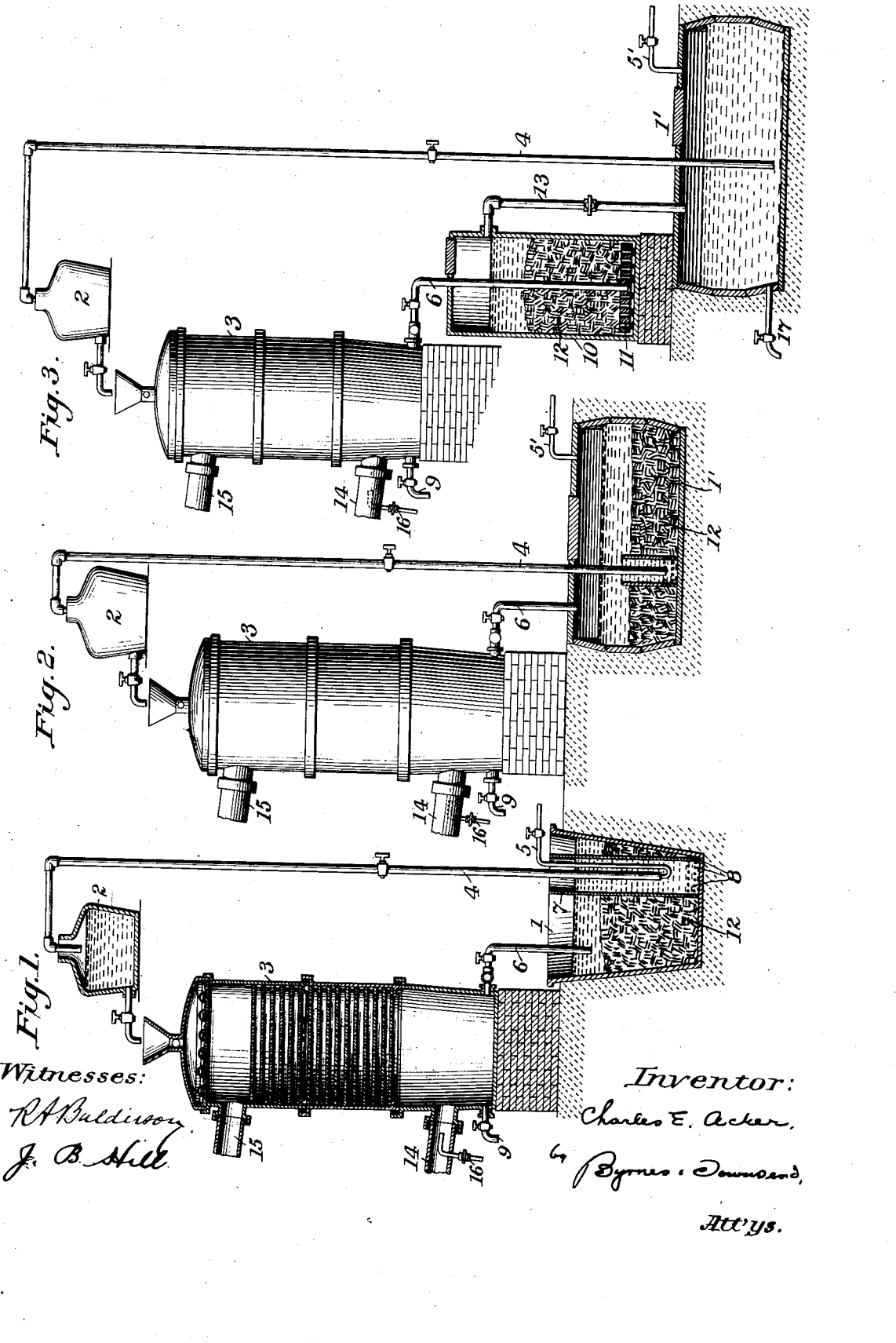

CHARLES E. ACKER, OF NIAGARA FALLS, NEW YORK, ASSIGNOR TO ACKER PROCESS COMPANY, A CORPORATION OF NEW JERSEY.

PROCESS OF MAKING STANNOUS CHLORID.

No. 810,455.   Specification of Letters Patent.   Patented Jan. 23, 1906.

Application filed June 8, 1903. Renewed June 14, 1905. Serial No. 265,238.

*To all whom it may concern:*

Be it known that I, CHARLES E. ACKER, a citizen of the United States, residing at Niagara Falls, in the county of Niagara and State of New York, have invented certain new and useful Improvements in Methods of Making Stannous Chlorid, of which the following is a specification.

In my copending application, Serial No. 160,564, filed June 8, 1903, I have described and claimed a method for the production of stannic chlorid in the form of solutions of a concentration heretofore unknown as a commercial product, said method consisting, substantially, in its preferred embodiment in bringing metallic tin into contact with a solvent containing chlorin, thereby producing a solution containing stannous chlorid, subjecting the solution so produced to the action of free chlorin or a gaseous mixture containing free chlorin to convert a part or all of the tin contained in the solution into stannic chlorid, bringing said stannic chlorid into contact with further quantities of tin, and again converting it to stannic chlorid, the operation being continued until the desired concentration is reached. As fully explained in said application, the concentration of stannic-chlorid solutions as heretofore produced has been limited in practice by several factors. Thus it has been customary to prepare solutions of stannic chlorid by reacting upon metallic tin with hydrochloric acid in solution, thereby forming stannous chlorid, and subsequently converting said stannous chlorid to stannic chlorid by addition of potassium chlorate to the acid solution. This process is relatively expensive, since the chlorin is derived from comparatively costly compounds—hydrochloric acid and potassium chlorate—and is furthermore subject to the disadvantages that the solutions produced cannot in practice exceed a density of 50° to 51° Baumé and are contaminated by the presence of considerable quantities of potassium chlorid derived from the reduction of the chlorate. Furthermore, it is impractical to concentrate such solutions by reason of the loss of stannic chlorid by volatilization and the tendency of the solutions to become basic. Solutions of a density of 60° Baumé have been prepared by first producing a solution of stannous chlorid, concentrating the same to saturation, and subsequently converting it by means of potassium chlorate to stannic chlorid; but this process is an expensive one and the solutions obtained are limited in concentration and are contaminated by potassium chlorid.

According to my method as above outlined and hereinafter more fully described I am able to produce solutions of stannic chlorid having a specific gravity varying between 1.800 and 1.960. I have now discovered that these highly-concentrated and pure solutions of stannic chlorid afford an extremely simple and economical source from which the dichlorid of tin, ($SnCl_2$,) commercially known as "tin-crystals," may be prepared in a state of substantial purity and without necessity for evaporating the solution at any stage of the process. I have discovered that if stannic-chlorid solutions of a concentration equal to or exceeding 1.800 specific gravity be converted by contact with metallic tin to stannous chlorid solutions of a corresponding concentration the stannous chlorid will separate from said solutions in the form of crystals of a high degree of purity and that if the conversion of the stannic chlorid in solution to stannous chlorid takes place at a temperature above the normal—say at about 50° to 60° centigrade—a large yield of the crystals will be obtained when the solution is permitted to cool.

I prefer to conduct the operation substantially as follows: Metallic tin, preferably in a suitably-divided condition, is brought into contact with a liquid containing chlorin, whereby a solution of stannous chlorid is formed. Said solution is then removed from the presence of the metal and is brought into contact, preferably in a suitable reaction-tower, with free chlorin or a gaseous mixture containing free chlorin. The stannous chlorid is thereby converted wholly or in part into stannic chlorid, which is returned into contact with the metallic tin and permitted to remain in contact therewith until sufficient tin has been dissolved to reduce the salt in whole or in part from the tetravalent to the divalent condition. It will be clear that the concentration of the stannous chlorid has been increased in proportion to the quantity of metal dissolved and that by a series of repetitions of the process the concentration may be brought to the point desired. I prefer to carry out the process at a temperature of 50° to 60° centigrade, but may operate at any temperature below the point at which stannic chlorid is volatilized.

The highly-concentrated and warm stannous-chlorid solutions produced as above described are permitted to remain in contact with metallic tin until substantially reduced to the divalent state and are then drawn off and permitted to cool, whereupon the stannous chlorid separates from solution in the form of crystals of substantial purity.

For the conversion of the tin from its divalent to its tetravalent condition it is neither necessary nor advisable to use pure chlorin gas; but the chlorin may be admixed with a large proportion of air or oxygen. Furthermore, I have discovered that the reaction is facilitated by the injection of steam into the chlorin, with the consequent formation of hydrochloric acid, or by the use of chlorin containing a certain proportion of hydrochloric acid.

I have employed a gaseous mixture containing ninety-five to ninety-six per cent. of air, four to five per cent. chlorin, and a small percentage of hydrochloric acid. It will be understood that the reaction evolves a considerable amount of heat and that the temperature, if uncontrolled, would rise rapidly to a point at which hydrochloric acid and stannic chlorid would be volatilized and the solution injuriously affected. The use of dilute chlorin as described possesses the advantage that a portion of this heat is absorbed in raising the temperature of the large volume of gas so provided and that therefore it is possible to utilize larger absolute quantities of chlorin in a given time—that is to say, one result of employing a dilute gas is to materially increase the output from a given apparatus. The addition of hydrochloric acid to the gas or to the solution or the utilization of gases containing hydrochloric acid results in the acceleration of the solvent action of stannic chlorid upon metallic tin and serves also to prevent the formation of oxychlorids of tin, the presence of which is in general undesirable.

It will be understood that the dilution of the chlorin need not be so great as above indicated by way of example and that proportionate effects are secured by the use of smaller proportions of the diluent.

It will be obvious that the character of the original liquid, which under the conditions of my process is to become a solution of stannous chlorid of high concentration, may be considerably varied. Thus water may be employed or any desired proportion of stannic chlorid, stannous chlorid, hydrochloric acid, or stannous or stannic oxychlorid may be added thereto. In any case the result of the treatment by chlorin is to form a solvent for tin, and the result of the repeated utilization and regeneration of this solvent and its final conversion to the divalent state is to form solutions of stannous chlorid of a concentration heretofore unattainable in a commercial way, said solutions yielding crystals of stannous chlorid, as above described.

Suitable apparatus for carrying out my process is shown in the accompanying drawings, wherein—

Figure 1 shows in vertical section one form of apparatus which may be used. Fig. 2 is a similar view showing a modified form thereof, and Fig. 3 is a similar view of a further modification.

Referring to Fig. 1, 1 represents a vat or tank, which may conveniently be of glazed earthenware, 2 is a storage-reservoir, and 3 a reaction-tower, shown as of the Rohrmann type, but which may be of any desired character. Means consisting of a conduit 4 and an air-injection pipe 5, leading into the lower portion thereof, are provided for continuously or intermittently conveying the solution in tank 1 to the storage-reservoir 2. From said reservoir the liquid is permitted to flow downwardly through tower 3 and to return thence by conduit 6 to the vat 1. The vat 1 contains a mass of metallic tin 12, preferably in a suitably-divided condition, and to maintain a body of clear liquid in the region of the inlet to the conduit 4 said conduit is surrounded by a protective casing 7, which is conveniently provided with apertures 8 at the lower end for the admission of the liquid. 9 represents a cock for withdrawing the solution from the reaction-tower.

Fig. 2 shows a modified form of device in which the liquid after being subjected to the action of chlorin in the reaction-tower 3 is permitted to flow into one of a series of pressure-tanks 1', a number of such tanks being provided and filled and discharged in succession, as will be readily understood. Said tanks 1' contain metallic tin 12, and after the solvent has been permitted to remain in contact therewith for a sufficient time the tank is closed and air-pressure applied above the surface of the liquid by means of a pipe 5', liquid being thereby forced to the upper reservoir 2, from which it returns through the tower 3, as above described. It will be obvious that any suitable means for securing the circulation of the liquid may be substituted for those described.

In Fig. 3 I have shown a further modification, wherein an intermediate tank, tower, or vat 10 is provided to contain the metallic tin and permit the reaction therewith of the solvent liquid from the tower. In said tank 10 I have shown a distributing-plate 11 for the inflowing solution and a discharge-pipe 13 for the delivery of the same to the pressure-tank or other elevating device 1'. 14 15 represent the inlet and outlet, respectively, for the gas, which serves to convert the tin from its divalent to its tetravalent condition. 16 is a pipe for the injection of steam into the chlorin in order to form therewith hydrochloric acid. 17 is a cock for withdrawing the solution from the pressure-tank.

To obtain the solution containing tin in the divalent condition, it may be withdrawn from the system at any point following the treatment with metallic tin—say from the vessels 1 1'—or it may be withdrawn after the treatment with chlorin and subjected in any suitable vessel to the action of metallic tin. Any stannic chlorid contained in the solution drawn from vessels 1 1' may of course be reduced by metallic tin, as hereinbefore described.

The apparatus herein shown is claimed in my copending application, Serial No. 160,566, filed June 8, 1903.

I claim—

1. The method of making stannous chlorid which consists in bringing metallic tin into contact with a solvent containing chlorin, thereby producing a solution containing stannous chlorid, subjecting said solution to the action of a fluid containing free chlorin to form stannic chlorid, and bringing said solution of stannic chlorid into contact with metallic tin to again form stannous chlorid, substantially as described.

2. The method of making stannous chlorid which consists in bringing metallic tin into contact with a solvent containing chlorin, thereby producing a solution containing stannous chlorid, subjecting said solution to the action of a fluid containing free chlorin to form stannic chlorid, bringing said solution of stannic chlorid into contact with metallic tin to again form stannous chlorid, and repeating the operation until the desired concentration is reached, substantially as described.

3. The method of making stannous chlorid which consists in bringing metallic tin into contact with a solvent containing chlorin, thereby producing a solution containing stannous chlorid, subjecting said solution to the action of free chlorin to form stannic chlorid, bringing said solution of stannic chlorid into contact with metallic tin to again form stannous chlorid, repeating the operation until the concentration of the stannic-chlorid solution exceeds 1.800, reducing said solution to stannous chlorid by contact with tin, and permitting said stannous-chlorid solution to crystallize, substantially as described.

4. The method of making stannous chlorid which consists in bringing metallic tin into contact with a solvent containing chlorin at a temperature above normal, thereby producing a solution containing stannous chlorid, subjecting said solution to the action of a fluid containing free chlorin to form stannic chlorid, bringing said solution of stannic chlorid into contact with metallic tin to again form stannous chlorid, repeating the operation until the concentration of the stannic-chlorid solution exceeds 1.800, reducing said solution to stannous chlorid by contact with tin, and permitting said stannous-chlorid solution to cool, whereby crystals of stannous chlorid are obtained, substantially as described.

5. The method of making stannous chlorid which consists in bringing metallic tin into contact with a solvent containing chlorin, thereby producing a solution containing stannous chlorid, subjecting said solution to the action of a gaseous mixture containing free chlorin and hydrochloric acid to form stannic chlorid, and bringing said solution of stannic chlorid into contact with metallic tin to again form stannous chlorid, substantially as described.

6. The method of making stannous chlorid which consists in bringing metallic tin into contact with a solvent containing chlorin, thereby producing a solution containing stannous chlorid, subjecting said solution to the action of a gaseous mixture containing free chlorin, hydrochloric acid, and atmospheric air to form stannic chlorid, and bringing said solution of stannic chlorid into contact with metallic tin to again form stannous chlorid, substantially as described.

7. The herein-described method of producing solutions containing stannous chlorid, which consists in subjecting solutions containing tin to the successive action of a fluid containing free chlorin and metallic tin, substantially as described.

8. The method of making stannous chlorid, which consists in subjecting solutions containing stannous chlorid to the action of a fluid containing free chlorin to form stannic chlorid, and bringing said stannic chlorid into contact with metallic tin, thereby producing a solution containing an increased amount of stannous chlorid, substantially as described.

In testimony whereof I affix my signature in presence of two witnesses.

CHARLES E. ACKER.

Witnesses:
J. H. SCHERMERHORN,
D. L. MACKAY.